United States Patent
El-Shoubary et al.

[11] Patent Number: 5,968,461
[45] Date of Patent: Oct. 19, 1999

[54] PROCESS FOR CLEANING MERCURY-CONTAMINATED SOILS

[75] Inventors: Youssef El-Shoubary, North Brunswick; William F. Lavosky, Brielle; Subash C. Seth, Watchung; Ned A. Speizer, Brick, all of N.J.

[73] Assignee: Merck & Co., Inc., Rahway, N.J.

[21] Appl. No.: 09/152,933

[22] Filed: Sep. 14, 1998

Related U.S. Application Data

[60] Provisional application No. 60/059,465, Sep. 22, 1997.

[51] Int. Cl.$^6$ .................................................. C22B 43/00
[52] U.S. Cl. ........................................... 423/109; 75/742
[58] Field of Search .............................. 423/109; 75/742; 134/2, 3; 209/38

[56] References Cited

U.S. PATENT DOCUMENTS

| | | |
|---|---|---|
| 1,637,481 | 8/1927 | Glaeser . |
| 1,731,699 | 10/1929 | Cavalli . |
| 3,476,552 | 11/1969 | Parks et al. . |
| 3,627,482 | 12/1971 | Olson et al. . |
| 3,755,110 | 8/1973 | Wygasch et al. . |
| 3,785,942 | 1/1974 | Carlson et al. . |
| 4,124,459 | 11/1978 | Blanch et al. . |
| 4,923,125 | 5/1990 | Bateson et al. ........................... 241/20 |
| 5,013,358 | 5/1991 | Ball et al. .................................. 75/742 |
| 5,183,479 | 2/1993 | Chintis . |
| 5,209,774 | 5/1993 | Rockandel et al. ...................... 423/109 |
| 5,226,545 | 7/1993 | Foust et al. . |
| 5,244,492 | 9/1993 | Cyr . |
| 5,266,494 | 11/1993 | Lahoda et al. ............................ 436/57 |
| 5,268,128 | 12/1993 | Lahoda et al. .......................... 423/109 |
| 5,300,137 | 4/1994 | Weyand et al. . |
| 5,303,871 | 4/1994 | Bateson et al. ........................... 241/20 |
| 5,314,527 | 5/1994 | Rockandel et al. ..................... 423/109 |
| 5,342,449 | 8/1994 | Holbein et al. ......................... 423/109 |
| 5,436,384 | 7/1995 | Grant et al. ................................. 588/1 |
| 5,494,649 | 2/1996 | Fristad et al. ............................. 423/27 |

OTHER PUBLICATIONS

Perry, R.A., "Mercury Recovery from Process Sludges," Chem. Eng. Progress, vol. 70, pp. 73–80 (1974).

Charlton, D.S. et al., "Commercial Mercury Remediation Demonstrations: Thermal Retorting and Physical Separation/Chemical Leaching," Gas Research Institute, Environment and Safety Research Group (1997).

Stepan, D.J. et al., "Remediation of Mercury–Contaminated Soils: Development and Testing of Technologies," Gas Research Institute, Environment and Safety Research Group (1995).

Stepan, D.J et al., "Remediation Technologies Applicable to Mercury Contamination at Natural Gas Industry Sites—Database Update," Gas Research Institute, Environment and Safety Research Group (1995).

Mulchandani, A.K. et al., "Studies in Removal of Mercury from Brine Mud," Chemical Age of India, vol. 31, No. 5, pp. 495–498 (1980).

Yang, M. et al., "Feasibility of extracting lead, cadmium, mercury, copper and zinc from soil using anhydrous ammonia," J. of Hazardous Materials, vol. 28 (1–2), pp. 212–213 (1991).

*Primary Examiner*—Steven Bos
*Attorney, Agent, or Firm*—Dianne Pecoraro; Mark R. Daniel

[57] ABSTRACT

The present invention relates to a process for cleaning mercury-contaminated soils that is simple, efficient and safe to use. This process can also be used to clean soils contaminated with additional metals, such as zinc, copper and lead, at a lower pH. The present invention involves screening the contaminated soil to remove unwanted materials, leaching the contaminated soils with hypochlorite in a screw reactor, thickening, leaching with hypochlorite and sodium chloride, thickening again and then separating the mercury-containing liquids from the clean soil. This invention also relates to a process which uses sulfide to treat the mercury-containing liquids.

27 Claims, 6 Drawing Sheets

PROCESS FOR CLEANING MERCURY-CONTAMINATED SOILS

DOMESTIC PRIORITY CLAIM

This application claims priority from the U.S. Provisional application No. 60/059,465, filed on Sep. 22, 1997.

BACKGROUND OF THE INVENTION

Because of the toxicity of mercury, there is great concern over any discharge of mercury into the environment. Until relatively recently, chemical plants did not take the necessary precautions when disposing of mercury containing materials. As a result, the soils and waters surrounding these plants are often contaminated with mercury or mercury compounds. The process of cleaning soils contaminated with metals is difficult since metals are strongly adsorbed or even diffused inside the pores of the soil matrix. Additionally, metallic mercury and most mercury species are not soluble in water.

If mercury exists in the soils in the presence of other metals, the removal process is even more costly and complicated. The price of disposing contaminated soils has increased dramatically in the past few years, particularly for disposal of mercury-contaminated soils, due to local, state and federal environmental regulations which restrict such disposal. Today, agencies that administer sites will usually require that the contaminated soils be treated rather than disposed of In most cases, more than one process technology is required to clean up the soils to meet federal and local standards, especially if more than one metal is present in the soils. This makes the clean up of the site more difficult, time consuming and expensive.

Several methods have been developed to recover the mercury from the solid materials. U.S. Pat. Nos. 5,314,527, 5,013,358 and 3,755,110 disclose processes that remove mercury from muds, sludge or other materials containing mercury compounds. However, most of these methods are complex and/or inefficient. Some even resulted in the discharge of a dangerous mercury vapor into the environment.

Leaching is most effectively accomplished when the solid particles are suspended in a liquid. However, heavy particles are generally difficult to suspend because they tend to settle out against the fluid motion of the liquid. As a result, when using agitation vessels, the heavy particles will accumulate and cause the system to clog or fail. Fractionation of the soil matrix may be used to avoid this problem but it complicates the process and increases the amount of time necessary to complete the cleaning process.

It is therefore the object of this invention to provide a process for cleaning mercury-contaminated soils that does not require fractionation of the soil matrix.

Another object of the invention is to provide a safe and efficient process for cleaning the mercury-contaminated water using sodium sulfide salts.

A further object of the invention is to provide an easy, economical and efficient process that can be used to clean soils contaminated with additional metals, such as zinc, copper and lead.

SUMMARY OF THE INVENTION

The present invention relates to a process for cleaning mercury-contaminated soils which does not require fractionation of the soils. This invention alleviates the drawbacks of previous processes by providing a simple, efficient method which utilizes a counter current continuous process that is safe to use. This process can also be used to clean soils contaminated with additional metals, such as zinc, copper and lead, at a lower pH.

DETAILED DESCRIPTION OF THE INVENTION

The present invention relates to a process for cleaning mercury-contaminated soils. This invention alleviates the drawbacks of the previous processes by providing a simple, efficient method that is safe to use. This process can also be used to recover additional metals, such as zinc, copper and lead, from the contaminated soils at a lower pH. The mercury recovery follows the equation below, wherein the mercury contaminated soils are reacted with a hypochlorite source, a chloride source and water to produce mercury chlorides and hydroxide ions.

$$Hg + OCl^- + 3Cl^- + H_2O \rightarrow HgCl_4^{-2} + 2OH^-$$

The mercury chlorides can subsequently be removed and disposed of properly.

In more detail, the process of the invention for cleaning soils contaminated with mercury comprises:

a. screening the contaminated soils to separate unwanted materials from the contaminated soils;

b. advancing the screened contaminated soils to a magnetic separator to remove scrap metals and to produce main stream soils;

c. separating the main stream soils into an oversize fraction and an undersize fraction;

d. directing the oversize fraction to a crusher;

e. screening the crushed oversize fraction to separate a non-soil fraction from crushed soil particles;

f. combining the crushed soil particles with the undersize fraction of step (c) and feeding the combined undersize fraction to a screw reactor;

g. adding a hypochlorite source to the screw reactor to leach the combined undersize fraction;

h. separating the leached undersize fraction to divide the fraction into a coarse fraction and a partially leached sand/fine fraction;

i. rinsing the coarse fraction with water or brine solution;

j. screening the rinsed coarse fraction to recover clean coarse fraction from any sand/fine fraction mixed with the coarse fraction; and k. combining any recovered sand/fine fraction with the sand/fine fraction of step (h) and feeding the combined sand/fine fraction to a first gravity thickener to achieve solid/liquid separation.

In another embodiment of the invention, the process comprises:

a. directing the solids from the first gravity thickener to a stirred tank reactor and contacting the solids with a solution of sodium hypochlorite and sodium chloride to form a slurry;
b. adding acid to adjust the pH of the slurry;
c. feeding the slurry to a second gravity thickener to separate the solids and liquids;
d. recycling the separated liquid to the screw reactor;
e. rinsing and filtering the separated solids with water to produce filtered soil and rinse water; and
f. mixing the filtered soil with an additive to convert any residual soluble mercury compounds to non-soluble mercury compounds and to produce clean soil.

In a further embodiment of the invention, the process comprises:
a. combining the rinse water with the leaching liquids from the first gravity thickener to produce a solution;
b. treating the solution with sodium sulfide salt to produce a solution containing mercury sulfides;
c. filtering the solution to recover the mercury sulfides; and
d. recycling the filtered solution back to the process The process of the invention can also be used to clean soil contaminated with other metals, such as zinc, lead and copper, by lowering the pH of the leaching solution.

Although metallic mercury and most mercury species are not soluble in water, mercury chlorides are very soluble at normal pressure and temperature. By keeping the mercury-contaminated soils in constant contact with the hypochlorite solution, most of the mercury species can be converted to mercury chlorides, which can be recovered using a water or brine rinse.

This process involves leaching the whole soil matrix without fractionation of the soil. While oversize or heavy particles tend to settle out against the fluid motion of a liquid in an agitation vessel, this process eliminates these particles using a screw classifier. Since the particles are kept in motion by the liquid current, satisfactory suspension of the particles requires an adequate circulation rate and an appropriate pattern of the liquid in the leaching vessel. The ease with which the particles are suspended depends on the settling velocity of the particles. This velocity in turn depends on the size, shape and density of the particles, the density and viscosity of the liquid and whether settling is free hindered. Settling rates are also governed by the volume fraction of solids in the suspension. When the solids occupy less than 0.3 of the volume of the suspension, the particles are practically free settling. When the volume fraction is above 0.5, hindered settling occurs.

Any source of hypochlorite can be used in the process of the invention. However, liquid hypochlorites such as sodium hypochlorite are most preferred.

The types of acid used in the process may include, but are not limited to, hydrochloric, acetic, citric, sulfuric, phosphoric, nitric, sulfonic, orthophosphoric, oxalic, malic, formic, carbonic, oleaic, and stearic. The addition of an acid is necessary for pH adjustment. To convert the mercury species to mercury chlorides, the pH should be between about 4 and about 7. If other metals exist in the soil as well, a lower pH is required to remove them. For example, a pH between 2 and 5 should be used to leach the metals if lead, copper and zinc exist in the soil.

Other objects and advantages of the present invention will become readily apparent to those skilled in the art from the following detailed description, wherein only the preferred embodiment of the invention has been shown, simply by way of illustration of the best mode contemplated. As will be realized, the invention is capable of modifications in various aspects, all without departing from the invention. Accordingly, the drawings and description are to be regarded as illustrative in nature, and not as restrictive.

As used herein, the term "main stream soils" refers to the soils once any unwanted materials such as scrap metals, boulders, concrete blocks, large rocks, wood, etc., have been removed.

As used herein, the phrase "oversize fraction" refers to coarse media, such as rocks, stones, etc. that are about 12.7 mm in size or more and the phrase "undersize fraction" refers to soil particles and coarse media that are less than about 12.7 mm in size.

As used herein, the term "coarse fraction" refers to coarse media and soils which are about 2 mm or larger in size. The term "sand/fine fraction" refers to soils that are less than about 2 mm in size.

Figure 1:
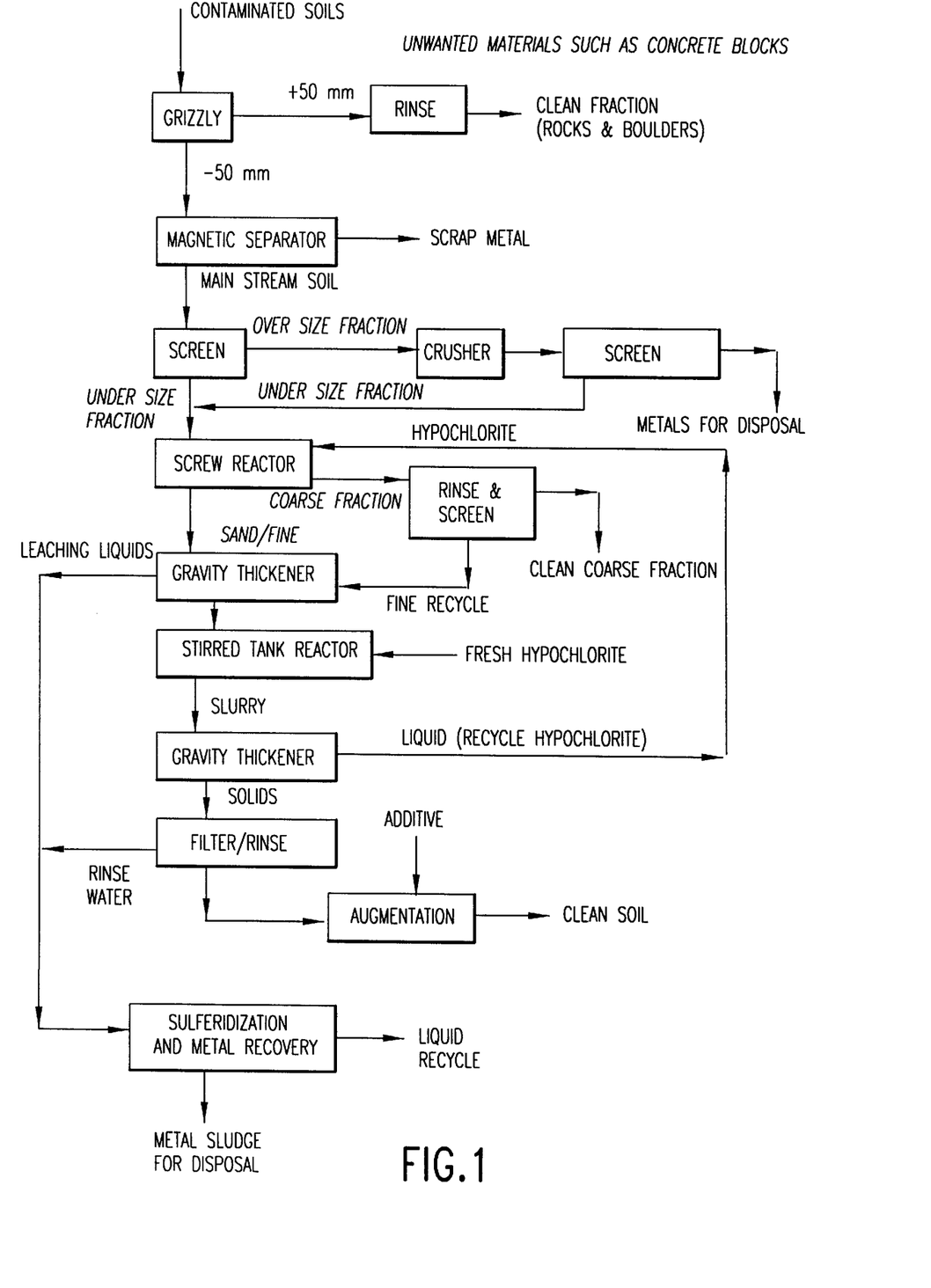
FIG. 1 is a schematic representation of the mercury recovery process.

Referring to the drawings, FIG. 1 is a schematic representation of the mercury recovery process. The contaminated soil is first screened in a grizzly to remove any unwanted materials, such as boulders, large rocks, concrete blocks, etc. Then the contaminated soils are directed to a magnetic separator to remove any scrap metals, such as nails, pipes, screws and other magnetic materials and to produce main stream soils.

The main stream soils are then screened and separated into two fractions, the oversize fraction and the undersize fraction. The oversize fraction does not require any further chemical treatment. However, sometimes other matter, such as battery caps, is mixed with the oversize fraction. Therefore, the oversize fraction is directed to a crusher which crushes the soil particles and flattens any oversize, non-soil fraction present. From the crusher, all of the materials are transferred to a screen which separates the flattened oversize fraction from the crushed soil particles. The crushed soil particles are then mixed with the undersize fraction obtained when the main stream soils were first screened.

The undersize fraction still contains contaminated materials and is advanced to a screw reactor to be leached with liquid sodium hypochlorite and sodium chloride. The screw reactor is a screw classifier with a stirring tank at its end. Because this is a continuous process, after the first operation, the undersize fraction will be leached with recycled sodium hypochlorite. Satisfactory results are demonstrated when the hypochlorite concentration is between about 0.10 milligrams to about 3.5 milligrams of hypochlorite per about 100 milligrams of mercury. Optimum results are seen when the hypochlorite concentration is about 1.5 milligrams to about 2.5 milligrams of hypochlorite per about 100 milligrams of mercury. The leached undersize fraction is then divided into a clean, coarse fraction and a partially leached sand/fine fraction. The clean coarse fraction is rinsed with water or brine solution and then screened to separate the coarse fraction from any fines which may have been mixed with the coarse fraction. If any fines are recovered from this separation step, they are added to the sand/fine fraction. The contaminated sand/fine fraction is fed to a first gravity thickener which separates the solids from the leaching liquids.

The solids that were separated by the first gravity thickener are directed to a continuous stirred tank reactor. In the stirred tank reactor, the mercury-containing solids are contacted with fresh sodium hypochlorite for about 5 to about 200 minutes to form a slurry. Acid is added to the slurry to adjust the pH. For the recovery of the mercury, the pH of the slurry is adjusted to about 4 to about 7. The preferred pH value to recover mercury is about 6.2 to about 6.5. To recover other metals, such as lead, zinc and copper, the pH of the slurry is adjusted to about 2 to about 5. The preferred pH value to recover the additional metals is about 3 to about 4.5.

Either fresh or recycled sodium chloride salt is added to the slurry at a concentration of about 2% to about 15%. The preferred concentration of the sodium chloride salt is about 4% to about 12%. To achieve optimum results, the sodium chloride salt concentration should be about 4% to about 7%. The reaction is maintained so that about 10% to about 50% of the slurry are solids. The preferred ratio is about 40% solids and about 60% liquids. The slurry is then fed to a second gravity thickener and the solids and liquids are separated. The separated solids are rinsed with water. The rinsed solids are filtered to produce filtered soil and rinse water. The filtered soil is then mixed with an additive to convert any residual, soluble mercury compounds and to produce clean soil. The types of additives used include, but are not limited to, calcium sulfide, magnesium sulfide, barium sulfide, calcium oxide, calcium hydroxide and any other sulfiding agent.

The rinse water is combined with the leaching liquids from the first gravity thickener to produce a solution. The solution is treated with sodium sulfide salt to convert the dissolved mercury to mercury sulfides and to eliminate any excess hypochlorite in the solution. Filtration or settlement is used to separate the non-soluble mercury compounds from the leaching solution. The mercury sulfides are recovered and the brine solution is recycled back to the process.

The liquid obtained from the second gravity filtered is recycled to the screw reactor and mixed with a fresh batch of contaminated soils. This mixing step will expend any excess hypochlorite that may be present and will leach any mercury from the fresh batch of contaminated soil. This step eliminates the need for additional chemicals to neutralize the excess hypochlorite.

For the recovery of mercury, the leaching solution has a temperature of about 2° C. to about 60° C., a pH of about 4 to about 7 and a solution potential of about 500 mv to about 1200 mv. When the process is used to recover metals other than mercury, the leaching solution has a temperature of about 2° C. to about 60° C., a pH of about 2 to about 5 and a solution potential of about 500 mv to about 1200 mv. For recovery of any of the metals, the retention time is about 5 minutes to about 200 minutes and the chloride level should be about 2 percent to about 15 percent by weight.

TEST RESULTS

Figure 2:
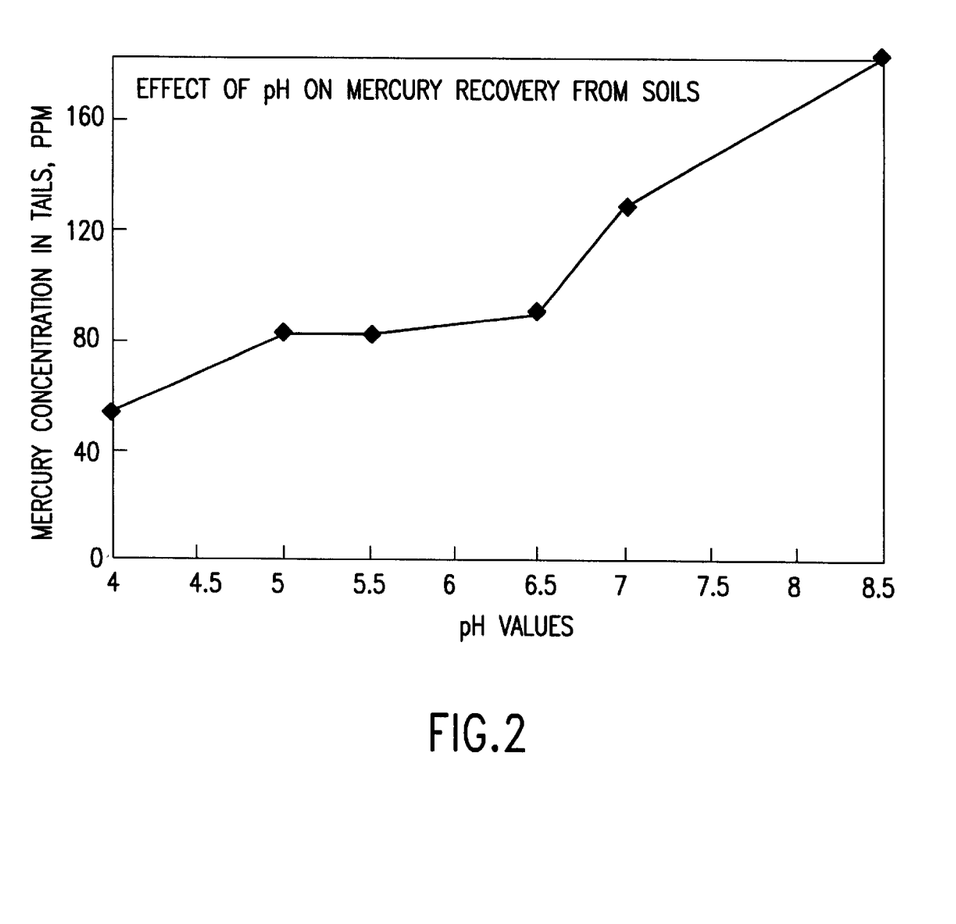
FIG. 2 shows the effect of pH on the leachability of mercury.

FIG. 2 shows the effect of pH on the leaching of mercury. The experiments were performed using about 0.25% sodium hypochlorite solution, about 6% sodium chloride, about 40% solids, and a residence time of about 30 minutes. The optimum pH for leaching mercury is between about 4 and about 6.5.

Figure 3:
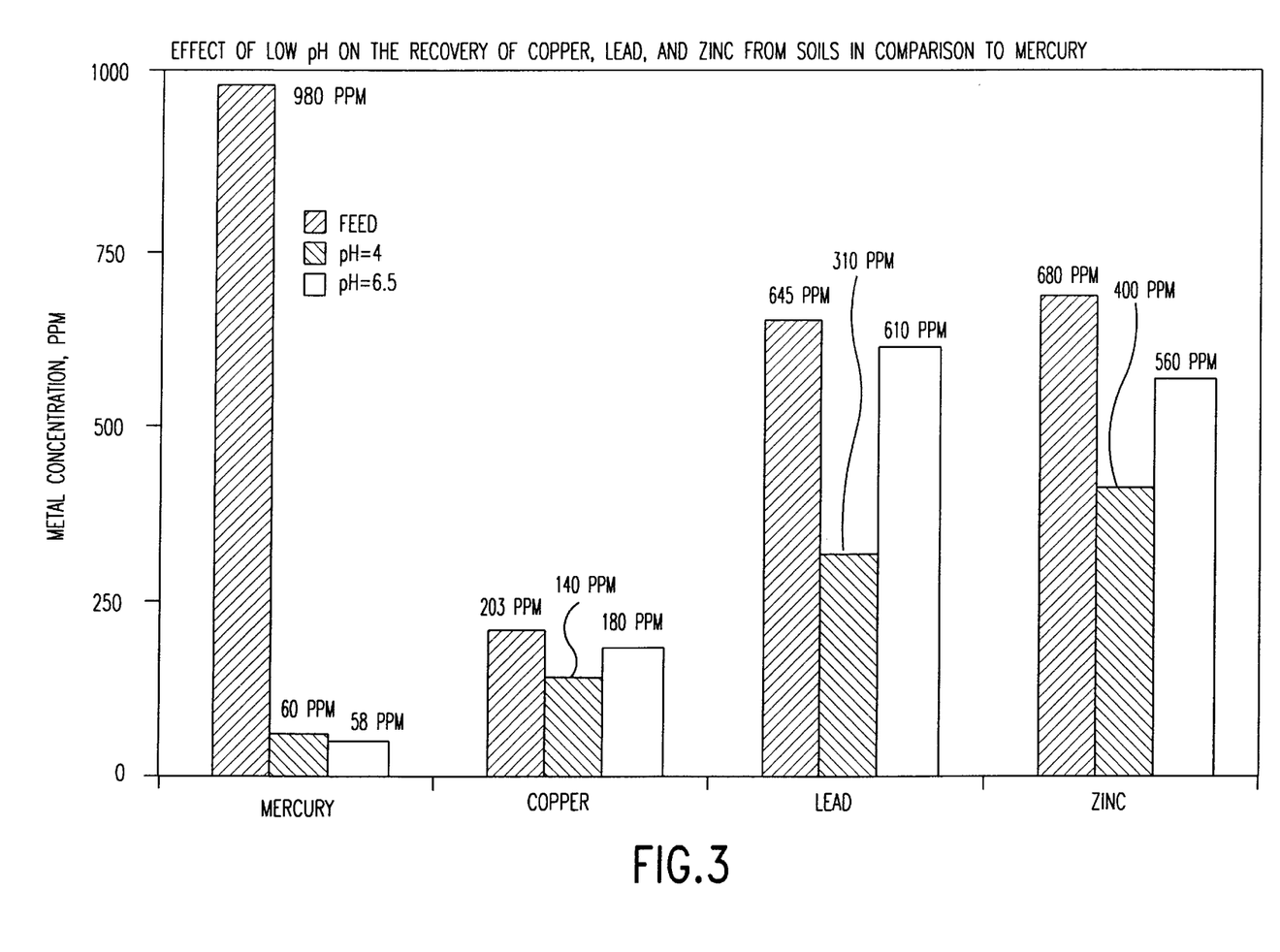
FIG. 3 shows the effect of pH on the leachability of zinc, copper and lead.

FIG. 3 shows the effect of using different pH levels on metal deposition, such as mercury, zinc, copper and lead, using hypochlorite leaching at low (pH is about 4) and moderate (pH is about 6.5) levels. The term "feed" refers to pre-treated soils which contain 1000 ppm of mercury. At a low pH of about 4, a reduction of about 93% in mercury, about 35% in zinc, about 55% in lead and about 25% in copper was demonstrated. At a moderate pH of about 6.5, a reduction of about 93% in mercury, about 15% in zinc, about 25% in lead and about 10% in copper was demonstrated.

Figure 4:
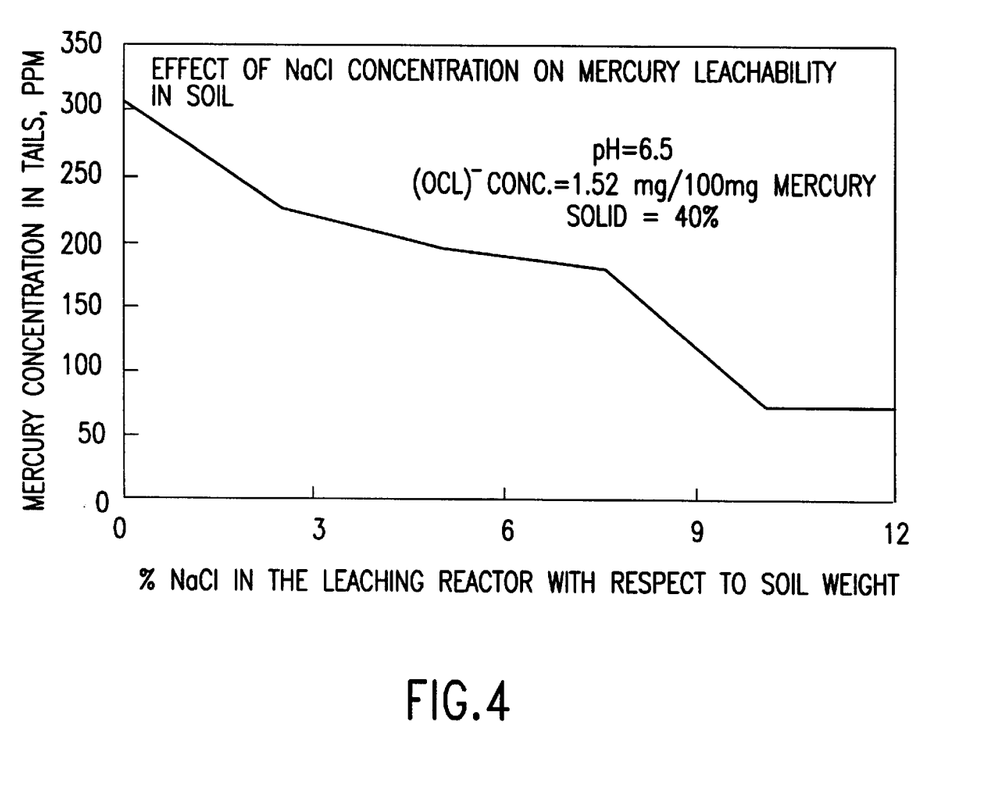
FIG. 4 shows the effect of the sodium chloride concentration on the leachability of mercury.

FIG. 4 shows the effect of the sodium chloride concentration on the leaching of mercury. All experiments were performed at a pH of about 6.5, about 40% solid concentration, about 1.5 milligrams of hypochlorite per about 100 milligrams of mercury, and a residence time of about 30 minutes. The sodium chloride concentration should be between about 2% and about 15% by weight in the leaching solution. Preferably, the sodium chloride concentration should be about 4% to about 12% by weight in the leaching solution. To achieve optimum results, the sodium chloride concentration should be about 4% to about 7% by weight.

Figure 5:
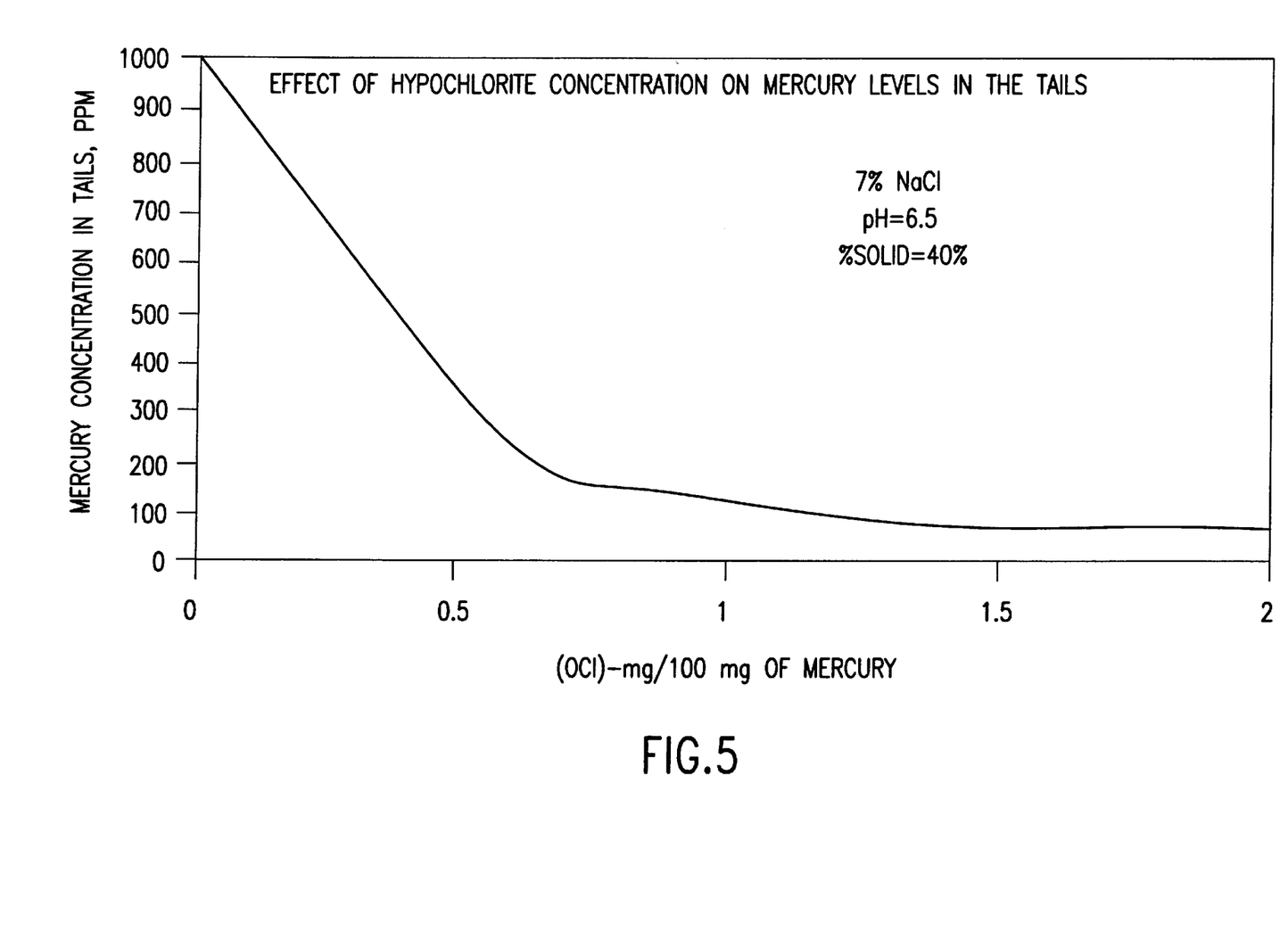
FIG. 5 shows the effect of the hypochlorite concentration on the leachability of mercury.

FIG. 5 gives the effect of hypochlorite concentration on the mercury concentration. The experiments were performed using about 7% sodium chloride and the pH was adjusted to about 6.5 using sulfuric acid. For about every 100 milligrams of mercury, about 0.10 milligrams to about 3.5 milligrams of hypochlorite is needed. Preferably, about 1.5 milligrams to about 2.5 milligrams of hypochlorite is used. The leaching residence time was kept to about 30 minutes for each experiment.

Figure 6:
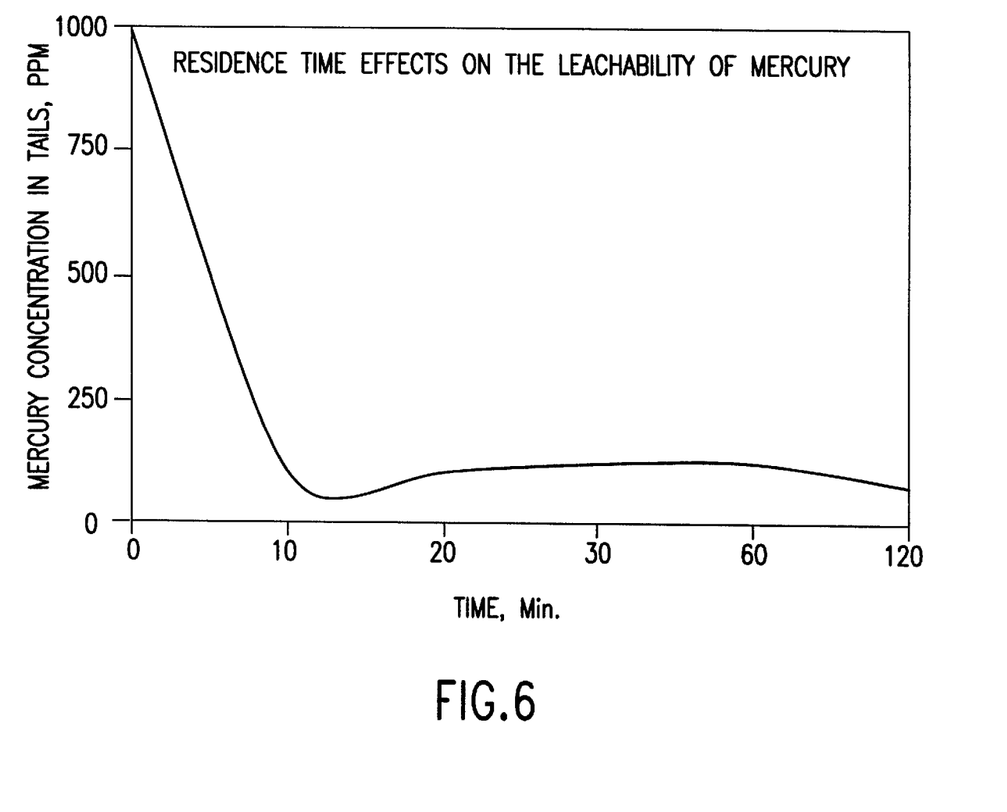
FIG. 6 shows the effect of residence time on the leachability of mercury.

FIG. 6 shows the effect of residence time on the mercury leachability in soils. The experiments were performed using about 40% solids, about 7% sodium chloride and about 1.5 milligrams hypochlorite per about 100 milligrams of mercury. The mercury concentration in the tails was reduced from about 1000 ppm to below about 100 ppm in less than about 15 minutes.

What is claimed is:

1. A process for cleaning soils contaminated with mercury comprising:

a. screening the contaminated soils to separate unwanted materials from the contaminated soils;

b. advancing the screened contaminated soils to a magnetic separator to remove scrap metals and to produce main stream soils;

c. separating the main stream soils into an oversize fraction and an undersize fraction;

d. directing the oversize fraction to a crusher;

e. screening the oversize fraction to separate a non-soil fraction from crushed soil particles;

f. combining the crushed soil particles with the undersize fraction of step (c) to produce a combined undersize fraction and feeding the combined undersize fraction to a screw reactor;

g. adding hypochlorite to the screw reactor to leach the combined undersize fraction;

h. separating the leached undersize fraction to divide the fraction into a clean coarse fraction and a leached sand/fine fraction;

i. rinsing the clean coarse fraction with water or brine solution;

j. screening the rinsed clean coarse fraction to recover the clean coarse fraction from any sand/fine fraction mixed with the clean coarse fraction; and k. combining any recovered sand/fine fraction with the sand/fine fraction of step (h) and feeding the combined sand/fine fraction to a first gravity thickener to separate the solids from any liquids.

2. The process of claim 1 further comprising:

a. directing the solids from the first gravity thickener to a stirred tank reactor and contacting the solids with a leaching solution of sodium hypochlorite and sodium chloride to form a slurry;

b. adding acid to adjust the pH of the slurry;

c. feeding the slurry to a second gravity thickener to separate the solids and liquids;

d. recycling the separated liquid to the screw reactor;

e. rinsing and filtering the separated solids with water to produce filtered soil and rinse water; and f. mixing the filtered soil with an additive to convert any residual soluble mercury compounds to non-soluble mercury compounds and to produce clean soil.

3. The process of claim 2 further comprising:

a. combining the rinse water with the liquids from the first gravity thickener to produce a solution;

b. treating the solution with sodium sulfide salt to produce a solution containing mercury sulfides;

c. filtering the solution to recover the mercury sulfides; and d. recycling the filtered solution back to the screw reactor or stirred tank reactor.

4. The process of claim 3 wherein the stirred tank reactor is operated continuously.

5. The process of claim 3 wherein the hypochlorite is liquid sodium hypochlorite.

6. The process of claim 5 wherein the concentration of hypochlorite is about 0.10 milligrams to about 3.5 milligrams hypochlorite per about 100 milligrams of mercury.

7. The process of claim 6 wherein the acid used is selected from the group consisting of hydrochloric, acetic, citric, sulfuric, phosphoric, nitric, sulfonic, orthophosphoric, oxalic, malic, formic, carbonic, oleaic, and stearic.

8. The process of claim 7 wherein the acid used is selected from the group consisting of sulfuric, hydrochloric, phosphoric, citric and acetic.

9. The process of claim 8 wherein the pH of the slurry is adjusted to about 4 to about 7.

10. The process of claim 9 wherein the solids from the first gravity thickener are contacted with fresh sodium hypochlorite for about 5 minutes to about 200 minutes.

11. The process of claim 10 wherein sodium chloride is added to the slurry to maintain a sodium chloride level of about 2 percent to about 15 percent by weight.

12. The process of claim 11 wherein the leaching solution has a temperature of about 2° C. to about 60° C. and a solution potential of about 500 mv to about 1200 mv.

13. The process of claim 12 wherein the slurry is kept at about 10% to about 50% solids.

14. The process of claim 13 wherein the slurry is kept at about 40% solids.

15. The process of claim 1 wherein the contaminated soils also contain metals selected from the group consisting of lead, copper and zinc.

16. The process of claim 15 further comprising:

a. directing the solids from the first gravity thickener to stirred tank reactor and contacting the solids with a leaching solution of sodium hypochlorite and sodium chloride to form a slurry;

b. adding acid to adjust the pH of the slurry;

c. feeding the slurry to a second gravity thickener to separate the solids and liquids;

d. recycling the separated liquid to the screw reactor;

e. rinsing and filtering the separated solids with water to produce filtered soil and a rinse water; and f. mixing the filtered soil with an additive to convert any residual soluble mercury compounds to non-soluble mercury compounds and to produce clean soil.

17. The process of claim 16 further comprising:

a. combining the rinse water with the leaching liquids from the first gravity thickener to produce a solution;

b. treating the solution with sodium sulfide salt to produce a solution containing mercury sulfides;

c. filtering the solution to recover the mercury sulfides; and d. recycling the filtered solution back to the the screw reactor or the stirred tank reactor.

18. The process of claim 17 wherein the stirred tank reactor is operated continuously.

19. The process of claim 18 wherein the concentration of hypochlorite is about 0.10 milligrams to about 3.5 milligrams hypochlorite per about 100 milligrams of mercury.

20. The process of claim 19 wherein the acid is selected from the group consisting of hydrochloric, acetic, citric, sulfuric, phosphoric, nitric, sulfonic, orthophosphoric, oxalic, malic, formic, carbonic, oleaic, and stearic.

21. The process of claim 20 wherein the acid is selected from the group consisting of sulfuric, hydrochloric, phosphoric, citric and acetic.

22. The process of claim 21 wherein the pH of the slurry is adjusted to about 2 to about 5.

23. The process of claim 22 wherein the solids from the first gravity thickener are contacted with fresh sodium hypochlorite for about 5 to about 200 minutes.

24. The process of claim 23 wherein sodium chloride is added to the slurry to maintain a sodium chloride level of about 2 to about 15 percent by weight.

25. The process of claim 24 wherein the leaching solution has a temperature of about 2° C. to about 60° C. with a solution potential of about 500 mv to about 1200 mv.

26. The process of claim 25 wherein the slurry is kept at about 10% to about 50% solids.

27. The process of claim 26 wherein the slurry is kept at about 40% solids.

* * * * *